(12) United States Patent
Mouri et al.

(10) Patent No.: US 7,263,830 B2
(45) Date of Patent: Sep. 4, 2007

(54) MASTER CYLINDER

(75) Inventors: Tomonori Mouri, Kai (JP); Yasuhiko Amari, Kofu (JP); Naganori Koshimizu, Kai (JP)

(73) Assignee: Hitachi, Ltd., Tokyo (JP)

( * ) Notice: Subject to any disclaimer, the term of this patent is extended or adjusted under 35 U.S.C. 154(b) by 65 days.

(21) Appl. No.: 11/334,389

(22) Filed: Jan. 19, 2006

(65) Prior Publication Data
US 2006/0174619 A1    Aug. 10, 2006

(30) Foreign Application Priority Data
Jan. 21, 2005   (JP) ............................. 2005-013668

(51) Int. Cl.
*B60T 11/26* (2006.01)
(52) U.S. Cl. ...................................... 60/588
(58) Field of Classification Search .................. 60/562, 60/585, 588, 589
See application file for complete search history.

(56) References Cited
U.S. PATENT DOCUMENTS
6,935,112 B2   8/2005   Koshimizu et al.

2004/0079078 A1 *  4/2004  Bacardit et al. .............. 60/562

FOREIGN PATENT DOCUMENTS
JP   2004-231093   8/2004
JP   2004-299568   10/2004

* cited by examiner

*Primary Examiner*—Michael Leslie
(74) *Attorney, Agent, or Firm*—Wenderoth, Lind & Ponack, L.L.P.

(57) ABSTRACT

A large-diameter bore portion is formed in a portion defining a pressure chamber in a cylinder body on a side opposite to a circumferential groove relative to a slidable inner-diameter portion. A communication groove capable of allowing communication between the circumferential groove and the large-diameter bore portion is formed in an upper portion of the slidable inner-diameter portion. A point of maximum depth of the communication groove is located radially outward of a bottom of the circumferential groove. The master cylinder of the present invention is capable of preventing the supply of a brake fluid from being restricted in an evacuation process, and enables a reduction in length to be machined of the communication groove, thus reducing the time for machining and suppressing an increase in cost.

20 Claims, 4 Drawing Sheets

MASTER CYLINDER

BACKGROUND OF THE INVENTION

The present invention relates to a master cylinder for supplying a brake fluid to a brake apparatus of a vehicle.

There is known a master cylinder for supplying a brake fluid to a brake apparatus of a vehicle, which comprises a cylinder body into which a plunger-type piston is directly inserted. In this master cylinder, to allow communication between a circumferential groove in which a piston seal is fittingly disposed and a brake fluid discharge passage which is formed on a side of the bottom of the cylinder body relative to the circumferential groove, an annular large-diameter groove is formed in the cylinder body on a side of the discharge passage, and a communication groove in a straight form connecting the large-diameter groove and the circumferential groove is formed in an upper portion of the cylinder body. When releasing air from the cylinder body, the piston seal is opened under differential pressure, and the brake fluid is flowed toward the discharge passage through a gap between the piston seal and the bottom of the circumferential groove, and the communication groove and the large-diameter groove (see, for example, Japanese Patent Public Disclosure No. 2004-231093). In this master cylinder, the communication groove is located inward of the bottom of the circumferential groove, relative to a radial direction of the cylinder body. Therefore, when releasing air by applying suction, due to the action of a negative pressure in the cylinder body, an end portion near the outer circumferential surface of the piston seal adheres to a side wall surface rising from the bottom of the circumferential groove, thereby preventing the brake fluid from flowing into the communication groove through the gap between the outer circumferential surface of the piston seal and the bottom of the circumferential groove. Therefore, the supply of the brake fluid is restricted and an air releasing operation must be repeated several times.

Therefore, it has been proposed to use a master cylinder in which a communication groove in an arcuate form for connecting the discharge passage and the circumferential groove in an upper portion of the cylinder body is formed outwardly beyond the bottom of the circumferential groove, relative to the radial direction of the cylinder. In this master cylinder, when releasing air, a brake fluid can be satisfactorily supplied through a gap between the outer circumferential surface of the piston seal and the bottom of the circumferential groove, and the communication groove, so that the number of repetitions of an air releasing operation for complete release of air can be minimized (see, for example, Japanese Patent Public Disclosure No. 2004-299568).

In the above-mentioned master cylinder, the center of arc of the arcuate communication groove is offset from the center axis of a slidable inner-diameter portion of the cylinder body. In addition, the communication groove is required to have a substantial length to be formed. Therefore, a substantial time is required for machining, which increases cost of manufacture.

SUMMARY OF THE INVENTION

Accordingly, it is an object of the present invention to provide a master cylinder which is capable of preventing the supply of a brake fluid from being restricted when releasing air, and which enables a reduction in length of the communication groove that is offset from the axis of the cylinder, to thereby suppress an increase in cost.

It is another object of the present invention to provide a master cylinder which is capable of suppressing air accumulation generated in an upper portion of the circumferential groove and in an upper portion of the communication groove.

In order to achieve the above-mentioned object, the present invention provides a master cylinder comprising:

a cylinder body in a cylindrical form having one end closed and including a discharge passage and a supply passage for a brake fluid, the supply passage being communicated with a reservoir;

a piston slidably disposed in a slidable inner-diameter portion of the cylinder body, the piston and the cylinder body forming a pressure chamber therebetween for supplying a fluid pressure to the discharge passage; and a piston seal provided in a circumferential groove formed in the cylinder body, the circumferential groove being located adjacent to the slidable inner-diameter portion, the piston seal having an inner circumferential surface thereof in slidable contact with an outer circumferential surface of the piston and being capable of sealingly disconnecting the supply passage and the pressure chamber which is pressurized by means of the piston, wherein a large-diameter bore portion is formed so as to axially extend in a portion defining the pressure chamber in the cylinder body on a side opposite to the circumferential groove relative to the slidable inner-diameter portion, the large-diameter bore portion having an axis that is the same as an axis of the slidable inner-diameter portion and having a larger diameter than the slidable inner-diameter portion, and wherein a communication groove capable of allowing communication between the circumferential groove and the large-diameter bore portion is formed in an upper portion of the slidable inner-diameter portion, a point of maximum depth of the communication groove being located radially outward of a bottom of the circumferential groove.

In the present invention, the large-diameter bore portion, which has an axis that is the same as the axis of the slidable inner-diameter portion, and has a larger diameter than the slidable inner-diameter portion, is formed so as to axially extend in a portion defining the pressure chamber in the cylinder body on a side opposite to the circumferential groove relative to the slidable inner-diameter portion. Therefore, the communication groove is only required to have a length sufficient for allowing communication between the circumferential groove and the large-diameter bore portion, which results in a reduction in the length to be machined of the communication groove. Therefore, an increase in manufacturing cost can be suppressed. Further, since the point of maximum depth of the communication groove is located radially outwardly from the bottom of the circumferential groove, the supply of a brake fluid is not restricted when releasing air in an evacuation process, for example.

According to an embodiment of the present invention, the uppermost point of the communication groove for allowing communication between the circumferential groove and the large-diameter bore portion is located in a position on the bottom of the circumferential groove or radially inward of the bottom of the circumferential groove, while being located on an upper side of the tangential line tangent to the uppermost point of the slidable inner-diameter portion. With this arrangement, it is possible to move a lower end position of an air accumulation volume generated in the circumferential groove to a position higher than the uppermost point of the slidable inner-diameter portion. Further, it is possible to avoid that, in an upper portion of the communication groove, undesirable air accumulation is generated at a position higher than the uppermost point of the bottom of the circumferential groove. Therefore, it is possible to reduce air accumulation generated in an upper portion of the circumferential groove and in the upper portion of the communication groove.

According to another embodiment of the present invention, the point of maximum depth of the communication groove is located on or on a lower side of the tangential line tangent to the uppermost point of the large-diameter bore portion. Therefore, a flow path area of the communication groove can be ensured while avoiding that, in a portion having a maximum depth in the communication groove, undesirable air accumulation is formed in a position higher than the uppermost point of the large-diameter bore portion.

According to a further embodiment of the present invention, the communication groove is in an arcuate form and is formed obliquely upward in a radial direction of the slidable inner-diameter portion. Therefore, a flow path area of the communication groove can be ensured while suppressing air accumulation.

According to a further embodiment of the present invention, the uppermost point of the communication groove is located on or on an upper side of the tangential line tangent to the uppermost point of the large-diameter bore portion. Therefore, a lower end position of an air accumulation volume generated in the circumferential groove can be moved to the uppermost point of the large-diameter bore portion.

According to a further embodiment of the present invention, the point of maximum depth of the communication groove is located on or on a lower side of the tangential line tangent to the uppermost point of the slidable inner-diameter portion. Therefore, it is possible to avoid that in a portion having a maximum depth in the communication groove, undesirable air accumulation is formed at a position higher than the uppermost point of the slidable inner-diameter portion.

According to a further embodiment of the present invention, the axial dimension of the slidable inner-diameter portion is made smaller than the axial dimension of the circumferential groove located adjacent to the slidable inner-diameter portion. Therefore, the length of the communication groove to be machined in the slidable inner-diameter portion can be minimized.

DETAILED DESCRIPTION OF THE INVENTION

Referring to FIGS. 1 to 5, an embodiment of the present invention is described.

Figure 1:
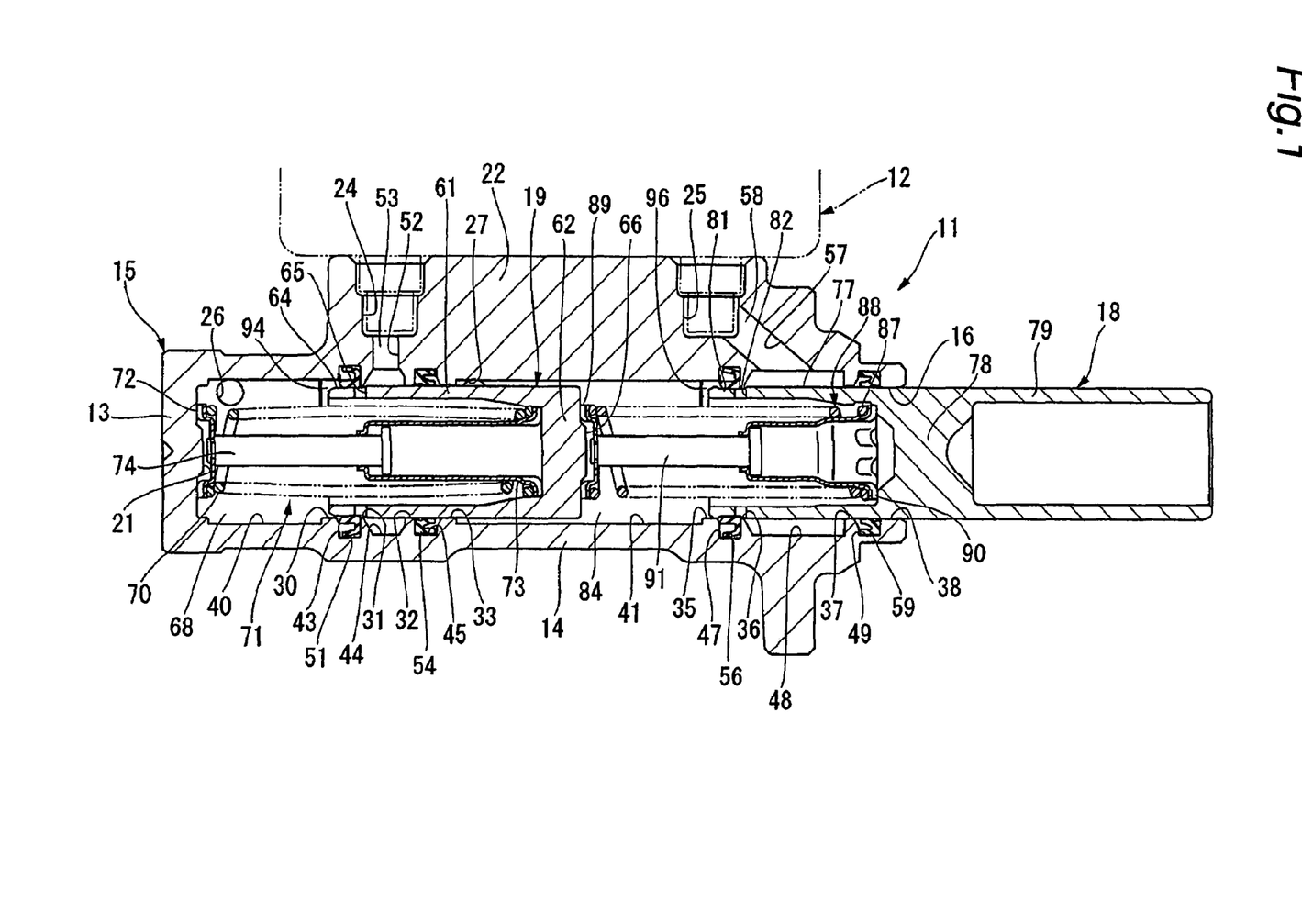
FIG. 1 shows a vertical section of a master cylinder in an embodiment of the present invention, taken along the cylinder axis.

In FIG. 1, reference numeral 11 denotes a master cylinder according to this embodiment. The master cylinder 11 is adapted to generate a brake fluid pressure corresponding to an input from a brake pedal, which is introduced through a brake booster (not shown) into the master cylinder. A reservoir 12 is connected to an upper side of the master cylinder 11 so as to allow a flow of a brake fluid between the reservoir 12 and the master cylinder 11.

The master cylinder 11 is of a tandem type. It comprises a cylinder body 15 formed from a single workpiece into a cylinder having one end closed. Specifically, the cylinder body 15 comprises a bottom portion 13 and a cylindrical portion 14, and is horizontally mounted on a vehicle. A primary piston (piston) 18 is disposed in the cylinder body 15 on a side of an open portion 16 thereof (on the right side in FIG. 1) so as to be capable of sliding movement along the axis of the cylindrical portion 14 of the cylinder body 15 (hereinafter, referred to simply as "the cylinder axis"). A secondary piston (piston) 19 is disposed in the cylinder body 15 on a side of the bottom portion 13 thereof (on the left side in FIG. 1) relative to the primary piston 18. The secondary piston 19 is also capable of sliding movement along the cylinder axis.

An engaging projection 21 is projected from an inner side of the bottom portion 13 of the cylinder body 15 in a direction of the cylinder axis.

The cylinder body 15 is integrally formed with a mount portion 22, which is located in a predetermined position in a circumferential direction of the cylindrical portion 14 (hereinafter referred to as "the circumferential direction of the cylinder"). The mount portion 22 is projected outward of the cylindrical portion 14 relative to a radial direction of the cylindrical portion 14 (hereinafter referred to as "the radial direction of the cylinder") while extending in the direction of the cylinder axis. Mount openings 24 and 25 for mounting the reservoir 12 to the mount portion 22 are formed such that they are spaced apart from each other in the direction of the cylinder axis and located at the same position in the circumferential direction of the cylinder.

A brake pipe (not shown) for supplying the brake fluid to a brake apparatus (not shown) is attached to a secondary discharge passage (discharge passage) 26 and a primary discharge passage (discharge passage) 27, which are formed in the cylindrical portion 14 of the cylinder body 15 on a side of the mount portion 22. The secondary discharge passage 26 and the primary discharge passage 27 are formed at the same position in the circumferential direction of the cylinder, and spaced apart from each other in the direction of the cylinder axis.

Figure 2:
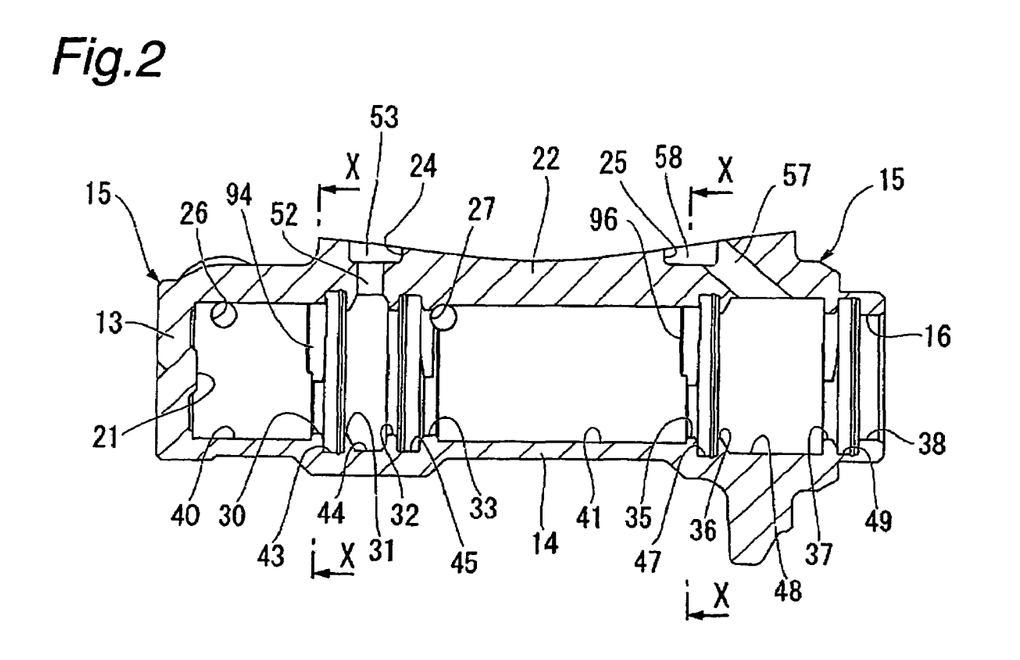
FIG. 2 shows a vertical section of a cylinder body used in the master cylinder in the embodiment of the present invention, taken along the cylinder axis.

In the cylindrical portion 14 of the cylinder body 15 on a side of the bottom portion 13, a plurality of (four in this embodiment) slidable inner-diameter portions 30, 31, 32 and 33, each having a circular cross-section perpendicular to the cylinder axis, are arranged in this order in a direction from the bottom portion 13 towards the open portion 16. The secondary piston 19 is fittingly disposed in the slidable inner-diameter portions 30 to 33 in a slidable manner. Similarly, in the cylindrical portion 14 of the cylinder body 15 on a side of the open portion 16, a plurality of (four in this embodiment) slidable inner-diameter portions 35, 36, 37 and 38, each having a circular cross-section perpendicular to the cylinder axis, are arranged in this order in the direction from the bottom portion 13 towards the open portion 16. The primary piston 18 is fittingly disposed in the slidable inner-diameter portions 35 to 38 in a slidable manner. The slidable inner-diameter portions 30 to 38 have the same axis and the same diameter. Of the slidable inner-diameter portions 30 to 38, only the slidable inner-diameter portions 30 and 35 correspond to the slidable inner-diameter portions referred to in the claims. As shown in FIG. 2, dimensions of the slidable inner-diameter portions 30 and 35 in the direction of the cylinder axis are made smaller than those of circumferential grooves 43 and 47 which are adjacent to the slidable inner-diameter portions 30 and 35, respectively. The circumferential grooves 43 and 47 will be described later in detail.

A large-diameter bore portion 40 is formed between the slidable inner-diameter portion 30 and the bottom portion 13 in the cylindrical portion 14 of the cylinder body 15. The large-diameter bore portion 40 has an axis that is the same as that of the slidable inner-diameter portions 30 to 33, and has a larger diameter than the slidable inner-diameter portions 30 to 33. The large-diameter bore portion 40 is located adjacent to the slidable inner-diameter portion 30. Similarly, a large-diameter bore portion 41 is formed between the slidable inner-diameter portions 33 and 35. The large-diameter bore portion 41 has an axis that is the same as that of the slidable inner-diameter portions 35 to 38, and has a larger diameter than the slidable inner-diameter portions 35 to 38. The large-diameter bore portion 41 is located adjacent to the slidable inner-diameter portion 35. Each of the large-diameter bore portions 40 and 41 extends in the direction of the cylinder axis. The large-diameter bore portion 40 is communicated with the secondary discharge passage 26, and the large-diameter bore portion 41 is communicated with the primary discharge passage 27. The respective diameters of the large-diameter bore portions 40 and 41 may be the same or different.

Between the slidable inner-diameter portions 30 and 31 in the cylindrical portion 14 of the cylinder body 15 on a side of the bottom portion 13, there is provided a circumferential seal groove (circumferential groove) 43 in an annular form that extends in the circumferential direction of the cylinder and recessed outwardly relative to the radial direction of the cylinder. The circumferential seal groove 43 is located adjacent to the slidable inner-diameter portion 30. Therefore, the large-diameter bore portion 40 is formed on a side of the bottom portion 13 relative to the slidable inner-diameter portion 30, that is, on a side opposite to the circumferential seal groove 43 relative to the slidable inner-diameter portion 30. Further, between the slidable inner-diameter portions 31 and 32, an open groove 44 is formed in an annular shape that extends in the circumferential direction of the cylinder and recessed outwardly relative to the radial direction of the cylinder. Further, between the slidable inner-diameter portions 32 and 33, a circumferential seal groove 45 is formed in an annular shape that extends in the circumferential direction of the cylinder and recessed outwardly relative to the radial direction of the cylinder.

Similarly, between the slidable inner-diameter portions 35 and 36 in the cylindrical portion 14 of the cylinder body 15 on a side of the open portion 16, there is provided a circumferential seal groove (circumferential groove) 47 in an annular form that extends in the circumferential direction of the cylinder and recessed outwardly relative to the radial direction of the cylinder. The circumferential seal groove 47 is located adjacent to the slidable inner-diameter portion 35. Therefore, the large-diameter bore portion 41 is formed on a side of the bottom portion 13 relative to the slidable inner-diameter portion 35, that is, on a side opposite to the circumferential seal groove 47 relative to the slidable inner-diameter portion 35. Further, between the slidable inner-diameter portions 36 and 37, an open groove 48 is formed in an annular shape that extends in the circumferential direction of the cylinder and recessed outwardly relative to the radial direction of the cylinder. Further, between the slidable inner-diameter portions 37 and 38, a circumferential seal groove 49 is formed in an annular shape that extends in the circumferential direction of the cylinder and recessed outwardly relative to the radial direction of the cylinder.

The circumferential seal groove 43 between the slidable inner-diameter portions 30 and 31 of the cylinder body 15 is formed in proximity to the mount opening 24 disposed on a side of the bottom portion 13. A piston seal 51 is fittingly disposed in the circumferential seal groove 43. The piston seal 51 is a cup seal having a substantially C-shaped cross-section, and is attached to the circumferential seal groove 43, with an opening thereof facing towards the bottom portion 13.

A communication bore 52 extending from the mount opening 24 on a side of the bottom portion 13 opens into the open groove 44 between the slidable inner-diameter portions 31 and 32 of the cylinder body 15. The open groove 44 and the communication bore 52 in combination mainly provide a secondary supply passage (supply passage) 53, which is capable of allowing communication between the cylinder body 15 and the reservoir 12 and which is always communicated with the reservoir 12.

A partition seal 54 is fittingly disposed in the circumferential seal groove 45 between the slidable inner-diameter portions 32 and 33 of the cylinder body 15. The partition seal 54 is a cup seal having a substantially C-shaped cross-section, and is attached to the circumferential seal groove 45, with an opening thereof facing towards the open portion 16.

The circumferential seal groove 47 between the slidable inner-diameter portions 35 and 36 of the cylinder body 15 is formed in proximity to the mount opening 25 disposed on a side of the open portion 16. A piston seal 56 is fittingly disposed in the circumferential seal groove 47. The piston seal 56 is a cup seal having a substantially C-shaped cross-section, and is attached to the circumferential seal groove 47, with an opening thereof facing towards the bottom portion 13.

A communication bore 57 extending from the mount opening 25 on a side of the open portion 16 opens into the open groove 48 between the slidable inner-diameter portions 36 and 37 of the cylinder body 15. The open groove 48 and the communication bore 57 in combination mainly provide a primary supply passage (supply passage) 58, which is capable of allowing communication between the cylinder body 15 and the reservoir 12 and which is always communicated with the reservoir 12.

A partition seal 59 is fittingly disposed in the circumferential seal groove 49 between the slidable inner-diameter portions 37 and 38 of the cylinder body 15. The partition seal 59 is a cup seal having a substantially C-shaped cross-section, and is attached to the circumferential seal groove 49, with an opening thereof facing towards the bottom portion 13.

The secondary piston 19 fittingly disposed in the cylinder body 15 on a side of the bottom portion 13 has a cylindrical form having one end closed. Specifically, the secondary piston 19 comprises a cylindrical portion 61 and a bottom portion 62 formed on one side of the cylindrical portion 61 in an axial direction of the cylindrical portion 61. The secondary piston 19 is slidably fitted into the slidable inner-diameter portions 30 to 33 of the cylinder body 15, with the cylindrical portion 61 being located on a side of the bottom portion 13 of the cylinder body 15. An annular stepped portion 64 is formed in an outer circumferential surface of an end portion of the cylindrical portion 61 on a side opposite to the bottom portion 62. The annular stepped portion 64 has a slightly smaller diameter than the other portion of the cylindrical portion 61. The annular stepped portion 64 of the cylindrical portion 61 includes a plurality of ports 65 radially formed therein on a side of the bottom portion 62. The ports 65 extend through the annular stepped portion 64 in the radial direction of the cylinder.

An engaging projection 66 is formed in the center, in a radial direction, of the bottom portion 62 of the secondary piston 19. The engaging projection 66 is projected toward the primary piston 18 in the direction of the cylinder axis.

A space surrounded by the bottom portion 13 of the cylinder body 15, mainly the large-diameter bore portion 40 of the cylindrical portion 14 and the secondary piston 19 forms a secondary pressure chamber (pressure chamber) 68 for supplying a fluid pressure to the secondary discharge passage 26. When the secondary piston 19 is positioned such that the ports 65 are open to the open groove 44, the secondary pressure chamber 68 is communicated with the secondary supply passage 53. An inner circumferential surface of the piston seal 51, which is disposed in the circumferential seal groove 43 of the cylinder body 15 on a side of the bottom portion 13, is adapted to make slidable contact with an outer circumferential surface of the secondary piston 19. When the secondary piston 19 moves to a position such that the ports 65 are located on a side of the bottom portion 13 relative to the piston seal 51, the piston seal 51 tightly disconnects the secondary supply passage 53 and the secondary pressure chamber 68, to thereby prevent communication between the secondary pressure chamber 68, and the secondary supply passage 53 and the reservoir 12.

The piston seal 51 prevents communication between the secondary pressure chamber 68, and the secondary supply passage 53 and the reservoir 12 when the fluid pressure in the secondary pressure chamber 68 becomes higher than the fluid pressure in the secondary supply passage 53 (i.e., atmospheric pressure) and when the fluid pressure in the secondary pressure chamber 68 becomes lower than the fluid pressure in the secondary supply passage 53, the piston seal 51 allows communication between the secondary pressure chamber 68, and the secondary supply passage 53 and the reservoir 12, to thereby supply the brake fluid to the secondary pressure chamber 68.

A spacing adjustment mechanism 71 including a secondary piston spring 70 is provided between the secondary piston 19 and the bottom portion 13 of the cylinder body 15, which determines a spacing between the secondary piston 19 and the bottom portion 13 of the cylinder body 15 in an initial state in which no input is applied from the brake pedal (from the right side in FIG. 1).

The spacing adjustment mechanism 71 comprises a spring retainer 72 which abuts against the bottom portion 13 of the cylinder body 15, a spring retainer 73 which abuts against the bottom portion 62 of the secondary piston 19 and a shaft member 74 having one end fixed to the spring retainer 72 and supporting the spring retainer 73 while permitting slidable movement thereof in a predetermined range. The secondary piston spring 70 is interposed between the spring retainers 72 and 73.

An end portion of the spacing adjustment mechanism 71 is positioned relative to the radial direction of the cylinder by means of the engaging projection 21, which is disposed inward of the spring retainer 72. The other end portion of the spacing adjustment mechanism 71 is positioned relative to the radial direction of the cylinder by being fitted into the cylindrical portion 61 of the secondary piston 19.

The primary piston 18 fittingly disposed in the cylinder body 15 on a side of the open portion 16 comprises a first cylindrical portion 77 and a bottom portion 78 formed on one side of the first cylindrical portion 77 in an axial direction of the first cylindrical portion 77 and a second cylindrical portion 79 formed on a side opposite to the first cylindrical portion 77 relative to the bottom portion 78. The primary piston 18 is slidably fitted into the slidable inner-diameter portions 35 to 38 of the cylinder body 15, with the first cylindrical portion 77 being located on a side of the secondary piston 19 in the cylinder body 15. An output shaft of the brake booster (not shown) is inserted into the second cylindrical portion 79, and presses the bottom portion 78.

An annular recessed portion 81 is formed in an outer circumferential surface of an end portion of the first cylindrical portion 77 on a side opposite to the bottom portion 78. The annular recessed portion 81 has a slightly smaller diameter than the other portion of the cylindrical portion 77. The annular recessed portion 81 of the first cylindrical portion 77 includes a plurality of ports 82 radially formed therein on a side of the bottom portion 78. The ports 82 extend through the annular recessed portion 81 in the radial direction of the cylinder.

A space surrounded by mainly the large-diameter bore portion 41 of the cylindrical portion 14 of the cylinder body 15, the primary piston 18 and the secondary piston 19 forms a primary pressure chamber (pressure chamber) 84 for supplying a fluid pressure to the primary discharge passage 27. When the primary piston 18 is positioned such that the ports 82 are open to the open groove 48, the primary pressure chamber 84 is communicated with the primary supply passage 58. An inner circumferential surface of the piston seal 56, which is disposed in the circumferential seal groove 47 of the cylinder body 15, is adapted to make slidable contact with an outer circumferential surface of the primary piston 18. When the primary piston 18 moves to a position such that the ports 82 are located on a side of the bottom portion 13 relative to the piston seal 56, the piston seal 56 tightly disconnects the primary supply passage 58 and the primary pressure chamber 84, to thereby prevent communication between the primary pressure chamber 84, and the primary supply passage 58 and the reservoir 12. The piston seal 56 prevents communication between the primary pressure chamber 84, and the primary supply passage 58 and the reservoir 12 when the fluid pressure in the primary pressure chamber 84 becomes higher than the fluid pressure in the primary supply passage 58 (i.e., atmospheric pressure) and when the fluid pressure in the primary pressure chamber 84 becomes lower than the fluid pressure in the primary supply passage 58, the piston seal 56 allows communication between the primary pressure chamber 84, and the primary supply passage 58 and the reservoir 12, to thereby supply the brake fluid to the primary pressure chamber 84.

The partition seal 54 in the circumferential seal groove 45 makes slidable contact with the secondary piston 19, and tightly disconnects the secondary pressure chamber 68 and the primary pressure chamber 84. The partition seal 59 in the circumferential seal groove 49 makes slidable contact with the primary piston 18, and tightly seals the primary supply passage 58 and the primary pressure chamber 84 from external air.

A spacing adjustment mechanism 88 including a primary piston spring 87 is provided between the secondary piston 19 and the primary piston 18, which determines a spacing between the secondary piston 19 and the primary piston 18 in the initial state in which no input is applied from the brake pedal (from the right side in FIG. 1).

The spacing adjustment mechanism 88 comprises a spring retainer 89 which abuts against the bottom portion 62 of the secondary piston 19, a spring retainer 90 which abuts against the bottom portion 78 of the primary piston 18 and a shaft member 91 having one end fixed to the spring retainer 89 and supporting the spring retainer 90 while permitting slidable movement thereof in a predetermined range. The primary piston spring 87 is interposed between the spring retainers 89 and 90.

An end portion of the spacing adjustment mechanism 88 is positioned relative to the radial direction of the cylinder by means of the engaging projection 66 of the secondary piston 19, which is disposed inward of the spring retainer 89. The other end portion of the spacing adjustment mechanism 88 is positioned relative to the radial direction of the cylinder by being fitted into the first cylindrical portion 77 of the primary piston 18.

Figure 3:
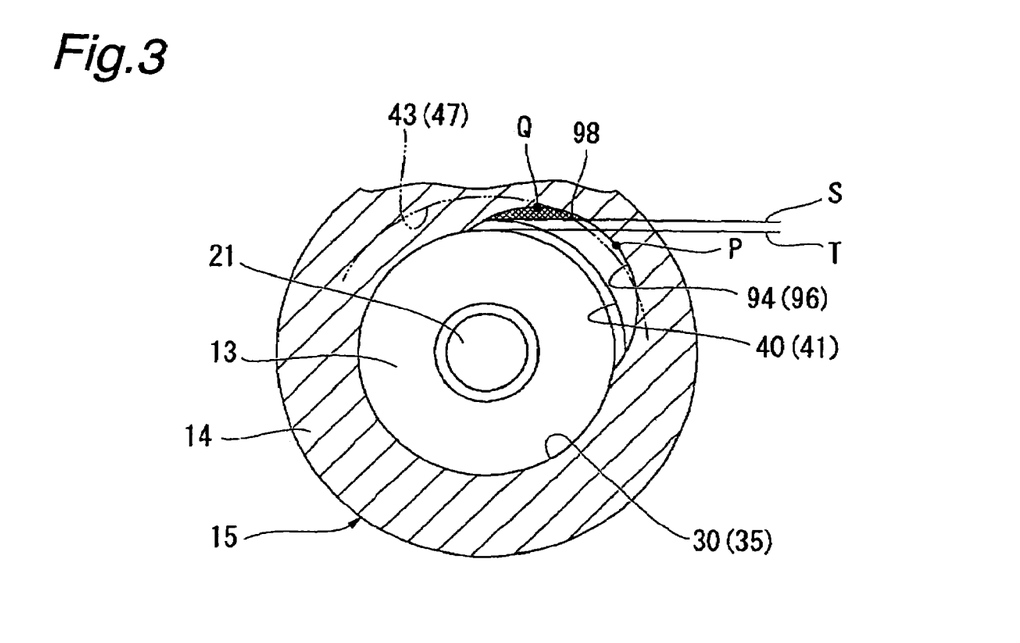
FIG. 3 is a cross-sectional view of the cylinder body used in the master cylinder in the embodiment of the present invention, taken along the line X-X in FIG. 2.

In this embodiment, as shown in FIGS. 2 and 3 (in FIG. 3, reference numerals used for secondary-side elements and elements common to the primary side and the secondary side are indicated without parentheses, and reference numerals used only for primary-side elements, described later, are indicated in parentheses), a communication groove 94 recessed outwardly relative to the radial direction of the cylinder is formed in the slidable inner-diameter portion 30 which is disposed between the circumferential seal groove 43 and the large-diameter bore portion 40 of the cylinder body 15. One end of the communication groove 94 opens into the circumferential seal groove 43, and the other end of the communication groove 94 opens into the large-diameter bore portion 40. The communication groove 94 functions to allow communication between the large-diameter bore portion 40, and hence the secondary discharge passage 26 communicated therewith, and the circumferential seal groove 43. The communication groove 94 is in an arcuate form having a diameter smaller than that of the slidable inner-diameter portion 30, and has a center axis offset from the cylinder axis of the slidable inner-diameter portion 30 and the large-diameter bore portion 40 in a parallel relationship to the cylinder axis.

The communication groove 94 is formed such that in an upper portion of the slidable inner-diameter portion 30, an uppermost point Q of the communication groove 94 is located in a position on the bottom of the circumferential seal groove 43 or in a position radially inward of the bottom of the circumferential seal groove 43, while being located on an upper side of a tangential line T which is tangent to an uppermost point of the circumference of the slidable inner-diameter portion 30. It is preferable for the uppermost point Q of the communication groove 94 to be located on a tangential line S which is tangent to an uppermost point of the circumference of the large-diameter bore portion 40, or to be located on an upper side of the tangential line S. Illustratively stated, the communication groove 94 is formed obliquely upward in a radial direction of the slidable inner-diameter portion 30. The communication groove 94 is formed obliquely at about 45 degrees relative to a vertically upward direction, in a manner such that one end portion thereof slightly extends beyond the uppermost point of the circumference of the slidable inner-diameter portion 30 in a counterclockwise direction as viewed in FIG. 3, while the other end portion thereof slightly extends beyond the rightmost point of the circumference of the slidable inner-diameter portion 30 in a clockwise direction in FIG. 3, and that an intermediate portion thereof extends in a full range of 90 degrees around the slidable inner-diameter portion 30 between the uppermost point and the rightmost point. In the communication groove 94, a point P of maximum depth is located outwardly from the bottom of the circumferential seal groove 43 relative to the radial direction of the cylinder, while being located on a lower side of the tangential line S which is tangent to the uppermost point of the large-diameter bore portion 40. It is preferable for the point P of maximum depth of the communication groove 94 to be located on the tangential line T which is tangent to the uppermost point of the slidable inner-diameter portion 30, or to be located on a lower side of the tangential line T. The communication groove 94 extends across the slidable inner-diameter portion 30 along the cylinder axis and extends slightly into the large-diameter bore portion 40.

Similarly, a communication groove 96 recessed outwardly relative to the radial direction of the cylinder is formed in the slidable inner-diameter portion 35 between the circumferential seal groove 47 and the large-diameter bore portion 41 of the cylinder body 15. One end of the communication groove 96 opens into the circumferential seal groove 47, and the other end of the communication groove 96 opens into the large-diameter bore portion 41. The communication groove 96 functions to allow communication between the large-diameter bore portion 41, and hence the primary discharge passage 27 communicated therewith, and the circumferential seal groove 47. The communication groove 96 is in an arcuate form having a diameter smaller than that of the slidable inner-diameter portion 35, and has a center axis offset from the cylinder axis of the slidable inner-diameter portion 35 and the large-diameter bore portion 41 in a parallel relationship to the cylinder axis.

The communication groove 96 is formed such that in an upper portion of the slidable inner-diameter portion 35, the uppermost point Q of the communication groove 96 is located in a position on the bottom of the circumferential seal groove 47 or in a position radially inward of the bottom of the circumferential seal groove 47, while being located on an upper side of the tangential line T which is tangent to an uppermost point of the circumference of the slidable inner-diameter portion 35. It is preferable for the uppermost point Q of the communication groove 96 to be located on the tangential line S which is tangent to an uppermost point of the circumference of the large-diameter bore portion 41, or to be located on an upper side of the tangential line S. Illustratively stated, the communication groove 96 is formed obliquely upward in a radial direction of the slidable inner-diameter portion 35. The communication groove 96 is formed obliquely at about 45 degrees relative to a vertically upward direction, in a manner such that one end portion thereof slightly extends beyond the uppermost point of the circumference of the slidable inner-diameter portion 35 in a counterclockwise direction as viewed in FIG. 3, while the other end portion thereof slightly extends beyond the rightmost point of the circumference of the slidable inner-diameter portion 35 in a clockwise direction in FIG. 3, and that an intermediate portion thereof extends in a full range of 90 degrees around the slidable inner-diameter portion 35 between the uppermost point and the rightmost point. In the communication groove 96, the point P of maximum depth is located outwardly from the bottom of the circumferential seal groove 47 relative to the radial direction of the cylinder, while being located on a lower side of the tangential line S which is tangent to the uppermost point of the large-diameter bore portion 41. It is preferable for the point P of maximum depth of the communication groove 96 to be located on the tangential line T which is tangent to the uppermost point of the slidable inner-diameter portion 35, or to be located on a lower side of the tangential line T. The communication groove 96 extends across the slidable inner-diameter portion 35 along the cylinder axis and extends slightly into the large-diameter bore portion 41. The communication groove 94 and the communication groove 96 are formed in the same position in the circumferential direction of the cylinder, and have the same depth.

The master cylinder 11 in this embodiment is arranged as mentioned above. On a side of the secondary piston 19 in the cylinder body 15, the communication groove 94, which functions to allow communication between the secondary discharge passage 26 and the circumferential seal groove 43, is formed outwardly beyond the bottom of the circumferential seal groove 43 relative to the radial direction of the cylinder. Therefore, in an evacuation process and during a return stroke of the piston 19, a brake fluid can be satisfactorily supplied to the cylinder through a gap between the outer circumferential surface of the piston seal 51 and the bottom of the circumferential seal groove 43, and the communication groove 94. Further, the large-diameter bore portion 40, which has an axis that is the same as the axis of the slidable inner-diameter portion 30, and has a larger diameter than the slidable inner-diameter portion 30, is formed on a side opposite to the circumferential seal groove 43 relative to the slidable inner-diameter portion 30, through which the secondary piston 19 is slidably inserted. Therefore, the communication groove 94 is only required to have a length sufficient for allowing communication between the circumferential seal groove 43 and the large-diameter bore portion 40, which results in a reduction in the length to be machined of the communication groove 94. Further, an axial dimension of the slidable inner-diameter portion 30 is made smaller than that of the circumferential seal groove 43 adjacent to the slidable inner-diameter portion 30, which enables the length to be machined of the communication groove 94 to be minimized. Therefore, an increase in manufacturing cost can be suppressed. Further, in the upper portion of the slidable inner-diameter portion 30, the uppermost point Q of the communication groove 94 for allowing communication between the circumferential seal groove 43 and the large-diameter bore portion 40 is located in a position on the bottom of the circumferential seal groove 43 or in a position radially inward from the bottom of the circumferential seal groove 43 while being located on an upper side of the tangential line T tangent to the uppermost point of the slidable inner-diameter portion 30 (preferably the tangential line S tangent to the uppermost point of the large-diameter bore portion 40). Therefore, it is possible to move a lower end position of an air accumulation volume generated in the circumferential seal groove 43 to a position higher than the uppermost point of the slidable inner-diameter portion 30 (preferably to the uppermost point of the large-diameter bore portion 40), and it is also possible to avoid that in an upper portion of the communication groove 94, undesirable air accumulation is generated at a position higher than an uppermost point of the bottom of the circumferential seal groove 43. Thus, it is possible to reduce air accumulation generated in an upper portion of the circumferential seal groove 43 while reducing air accumulation 98 indicated by a mesh portion in FIG. 3 generated in the upper portion of the communication groove 94.

In addition, the communication groove 94 is formed obliquely upward in the radial direction of the slidable inner-diameter portion 30, and the point P of maximum depth of the communication groove 94 is located on a lower side of the tangential line S tangent to the uppermost point of the large-diameter bore portion 40 (preferably the tangential line T tangent to the uppermost point of the slidable inner-diameter portion 30). Therefore, a flow path area of the communication groove 94 can be ensured while reliably suppressing the air accumulation generated in the circumferential seal groove 43 and in the communication groove 94.

Figure 4:
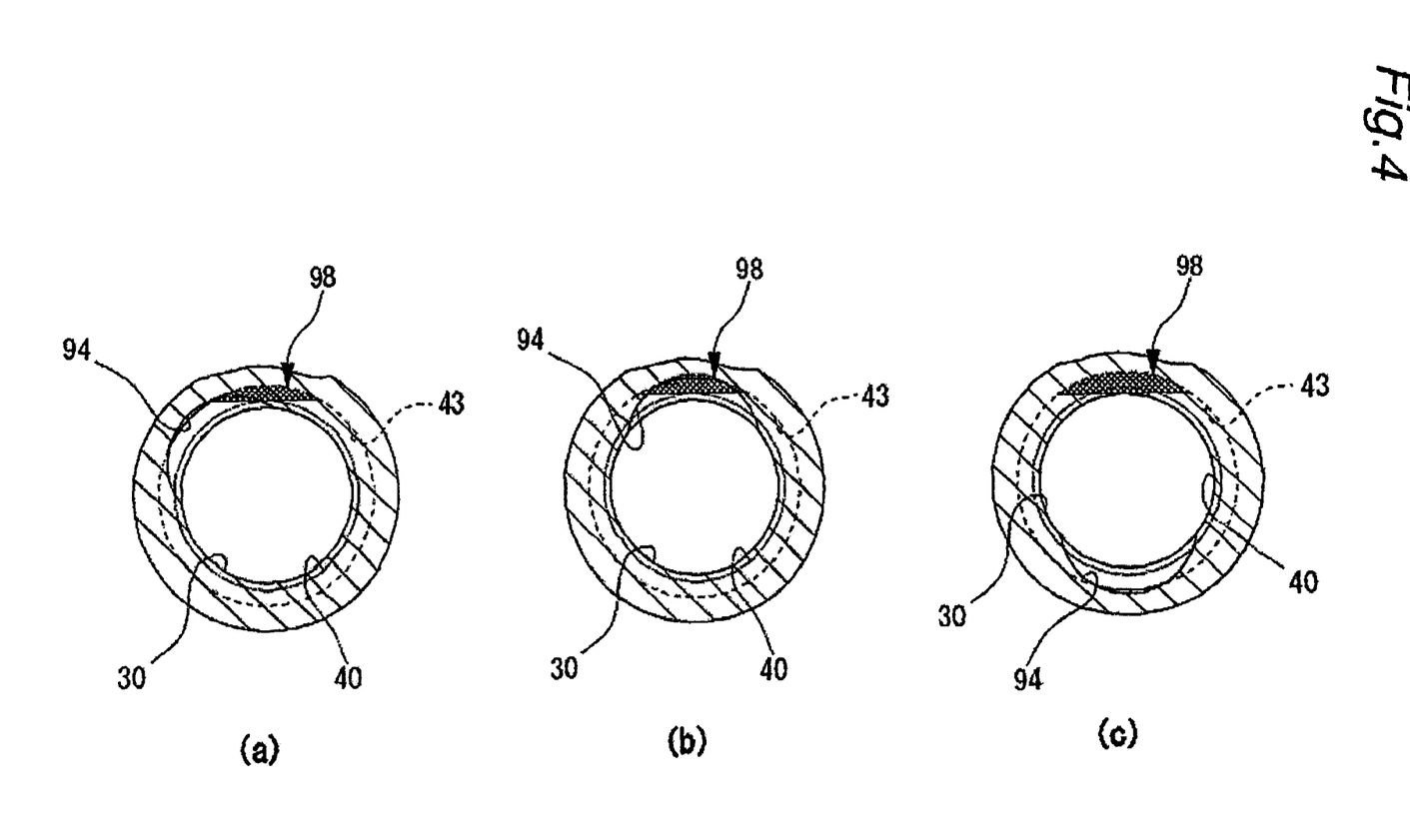
FIG. 4 shows a comparison of the cylinder body of the master cylinder in the embodiment of the present invention with other cylinder bodies based on a position of a communication groove, each of the cylinder bodies being illustrated in cross section perpendicular to the cylinder axis.

In fact, when the communication groove 94 is formed obliquely at about 45 degrees relative to a vertical direction as shown in FIG. 4(a), with the diameters of the circumferential seal groove 43, the slidable inner-diameter portion 30 and the large-diameter bore portion 40 being set to be 32 mm, 25.5 mm and 27.4 mm, respectively, a volume of the air accumulation 98 generated in the upper portion of the communication groove 94 and the upper portion of the circumferential seal groove 43, which is indicated by a mesh portion in FIG. 4(a), is 113 mm$^3$. This is lower than the volume of the air accumulation 98 (mesh portion) generated when the communication groove 94 is formed in a vertically upward position as shown in FIG. 4(b), that is, 191 mm$^3$, and also lower than the volume of the air accumulation 98 (mesh portion) when the communication groove 94 as a whole is formed on a lower side of the uppermost point of the large-diameter bore portion 40; for example, when the communication groove 94 is formed in a vertically downward position as shown in FIG. 4(c), that is, 160 mm$^3$. As is understood from FIG. 4(b), if the communication groove 94 is formed in a vertically upward position, since it is impossible to release air from a space in a position higher than the uppermost point of the large-diameter bore portion 40, air accumulation occurs in a portion of the communication groove 94 having a depth larger than that of the bottom of the circumferential seal groove 43, thus increasing the volume of the air accumulation 98.

Similarly, on a side of the primary piston 18 in the cylinder body 15, the communication groove 96, which functions to allow communication between the primary discharge passage 27 and the circumferential seal groove 47, is formed outwardly beyond the bottom of the circumferential seal groove 47 relative to the radial direction of the cylinder. Therefore, in an evacuation process and during a return stroke of the piston 18, a brake fluid can be satisfactorily supplied to the cylinder through a gap between the outer circumferential surface of the piston seal 56 and the bottom of the circumferential seal groove 47, and the communication groove 96. Further, the large-diameter bore portion 41, which has an axis that is the same as the axis of the slidable inner-diameter portion 35, and has a larger diameter than the slidable inner-diameter portion 35, is formed on a side opposite to the circumferential seal groove 47 relative to the slidable inner-diameter portion 35, through which the primary piston 18 is slidably inserted. Therefore, the communication groove 96 is only required to have a length sufficient for allowing communication between the circumferential seal groove 47 and the large-diameter bore portion 41, which results in a reduction in the length to be machined of the communication groove 96. Further, an axial dimension of the slidable inner-diameter portion 35 is made smaller than that of the circumferential seal groove 47 adjacent to the slidable inner-diameter portion 35, which enables the length to be machined of the communication groove 96 to be minimized. Therefore, an increase in manufacturing cost can be suppressed. Further, in the upper portion of the slidable inner-diameter portion 35, the uppermost point Q of the communication groove 96 for allowing communication between the circumferential seal groove 47 and the large-diameter bore portion 41 is located in a position on the bottom of the circumferential seal groove 47 or in a position radially inward from the bottom of the circumferential seal groove 47 while being located on an upper side of the tangential line T tangent to the uppermost point of the slidable inner-diameter portion 35 (preferably the tangential line S tangent to the uppermost point of the large-diameter bore portion 41). Therefore, it is possible to move a lower end position of an air accumulation volume generated in the circumferential seal groove 47 to a position higher than the uppermost point of the slidable inner-diameter portion 35 (preferably to the uppermost point of the large-diameter bore portion 41), and it is also possible to avoid that in an upper portion of the communication groove 96, undesirable air accumulation is generated at a position higher than an uppermost point of the bottom of the circumferential seal groove 47. Thus, it is possible to reduce air accumulation generated in an upper portion of the circumferential seal groove 47 while reducing the air accumulation 98 indicated by the mesh portion in FIG. 3 generated in the upper portion of the communication groove 96.

In addition, the communication groove 96 is formed obliquely upward in the radial direction of the slidable inner-diameter portion 35, and the point P of maximum depth of the communication groove 96 is located on a lower side of the tangential line S tangent to the uppermost point of the large-diameter bore portion 41 (preferably the tangential line T tangent to the uppermost point of the slidable inner-diameter portion 35). Therefore, a flow path area of the communication groove 96 can be ensured while reliably suppressing the air accumulation generated in the circumferential seal groove 47 and in the communication groove 96.

Figure 5:
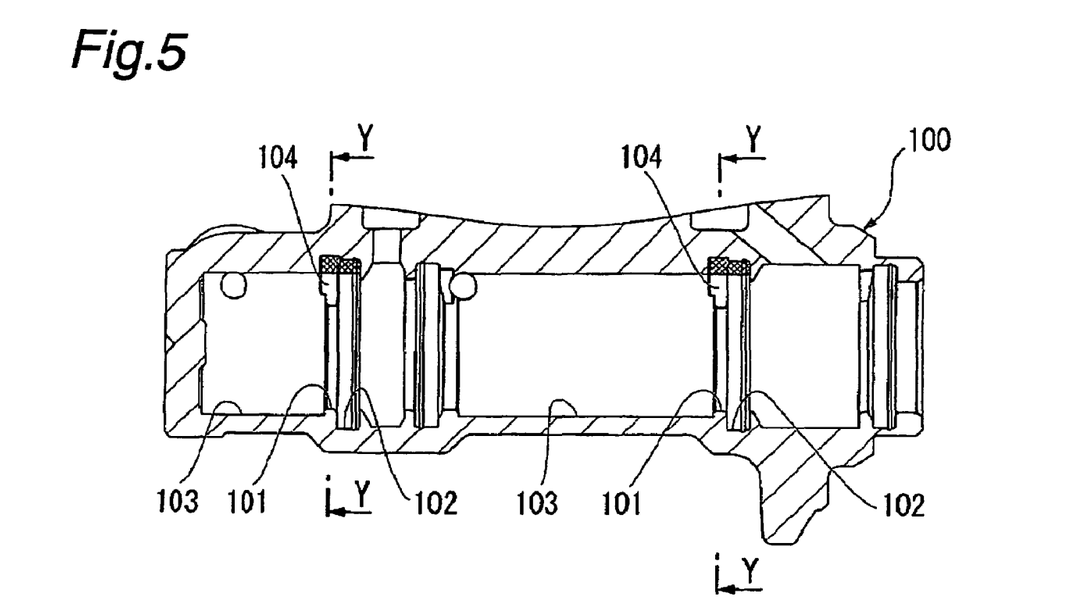
FIG. 5 shows a vertical section of a cylinder body used in a master cylinder in a second embodiment of the present invention, taken along the cylinder axis.
Figure 6:
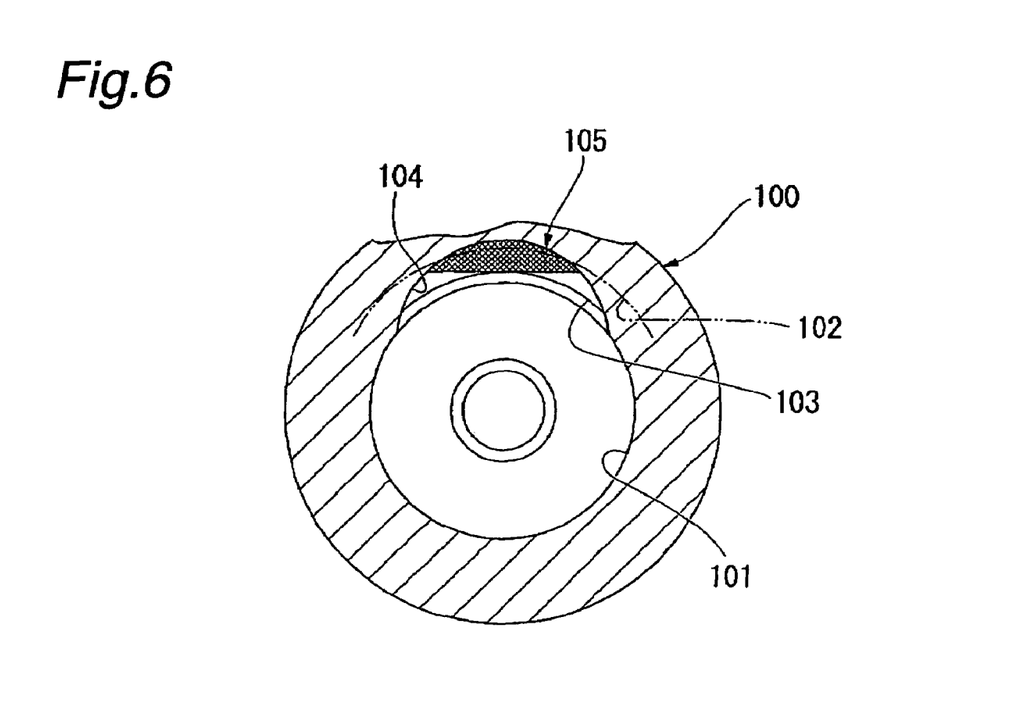
FIG. 6 is a cross-sectional view of the cylinder body used in the master cylinder in the second embodiment of the present invention, taken along the line Y-Y in FIG. 5.

Incidentally, an embodiment such as that described below is possible, if it is intended to obtain only an effect of ensuring communication between the circumferential seal groove 43 and the pressure chamber 68 for supply of a brake fluid without being prevented by the piston seal 51, irrespective of a volume of air accumulation. That is, as shown in FIGS. 5 and 6, in a cylinder body 100 comprising a slidable inner-diameter portion 101 for slidable insertion of a piston (not shown), a large-diameter bore portion 103 having an axis that is the same as that of the slidable inner-diameter portion 101, and having a larger diameter than the slidable inner-diameter portion 101, is formed adjacent to the slidable inner-diameter portion 101 on a side opposite to a circumferential seal groove 102. Further, as shown in FIG. 6, a communication groove 104 is formed in an upper portion of the slidable inner-diameter portion 101 so as to extend outwardly beyond the bottom of the circumferential seal groove 102 relative to the radial direction of the cylinder. With this arrangement, in an evacuation process and during a return stroke of the piston, a brake fluid can be satisfactorily supplied to the cylinder through a gap between an outer circumferential surface of a piston seal in the circumferential seal groove 102 and the bottom of the circumferential seal groove 102, and the communication groove 104. It is also possible to reduce the length to be machined of the communication groove 104, thus reducing the time for a machining operation and suppressing an increase in manufacturing cost.

In the above embodiments, the large-diameter bore portions 40 and 41 extend along the cylinder axis and are directly communicated with the secondary discharge passage 26 and the primary discharge passage 27, respectively. However, in the present invention, the large-diameter bore portion 40 and the large-diameter bore portion 41 may be communicated with the secondary discharge passage 26 and the primary discharge passage 27 through the pressure chambers 68 and 84, as long as the communication can be ensured under movement of the pistons 18 and 19.

What is claimed is:

1. A master cylinder comprising:
   a cylinder body in a cylindrical form having one end closed and including a discharge passage and a supply passage for a brake fluid, the supply passage being communicated with a reservoir;
   a piston slidably disposed in a slidable inner-diameter portion of the cylinder body, the piston and the cylinder body forming a pressure chamber therebetween for supplying a fluid pressure to the discharge passage; and
   a piston seal provided in a circumferential groove formed in the cylinder body, the circumferential groove being located adjacent to the slidable inner-diameter portion, the piston seal having an inner circumferential surface thereof in slidable contact with an outer circumferential surface of the piston and being capable of sealingly disconnecting the supply passage and the pressure chamber which is pressurized by means of the piston,
   wherein a large-diameter bore portion is formed so as to axially extend in a portion defining the pressure chamber in the cylinder body on a side opposite to the circumferential groove relative to the slidable inner-diameter portion, the large-diameter bore portion having an axis that is the same as an axis of the slidable inner-diameter portion and having a larger diameter than the slidable inner-diameter portion, and
   wherein a communication groove capable of allowing communication between the circumferential groove and the large-diameter bore portion is formed in an upper portion of the slidable inner-diameter portion, a point of maximum depth of the communication groove being located radially outward of a bottom of the circumferential groove.

2. A master cylinder according to claim 1, wherein an uppermost point of the communication groove is located in a position on the bottom of the circumferential groove or radially inward of the bottom of the circumferential groove, while being located on an upper side of a tangential line tangent to an uppermost point of the slidable inner-diameter portion.

3. A master cylinder according to claim 2, wherein the point of maximum depth of the communication groove is located on or on a lower side of a tangential line tangent to an uppermost point of the large-diameter bore portion.

4. A master cylinder according to claim 2, wherein the communication groove is in an arcuate form and is formed obliquely upward in a radial direction of the slidable inner-diameter portion.

5. A master cylinder according to claim 2, wherein the uppermost point of the communication groove is located on or on an upper side of a tangential line tangent to an uppermost point of the large-diameter bore portion.

6. A master cylinder according to claim 2, wherein the point of maximum depth of the communication groove is located on or on a lower side of the tangential line tangent to the uppermost point of the slidable inner-diameter portion.

7. A master cylinder according to claim 2, wherein an axial dimension of the slidable inner-diameter portion is made smaller than an axial dimension of the circumferential groove located adjacent to the slidable inner-diameter portion.

8. A master cylinder according to claim 2, wherein the large-diameter bore portion is communicated with the discharge passage.

9. A master cylinder according to claim 1, wherein the point of maximum depth of the communication groove is located on or on a lower side of a tangential line tangent to an uppermost point of the large-diameter bore portion.

10. A master cylinder according to claim 9, wherein the communication groove is in an arcuate form and is formed obliquely upward in a radial direction of the slidable inner-diameter portion.

11. A master cylinder according to claim 9, wherein the uppermost point of the communication groove is located on or on an upper side of the tangential line tangent to the uppermost point of the large-diameter bore portion.

12. A master cylinder according to claim 9, wherein an axial dimension of the slidable inner-diameter portion is made smaller than an axial dimension of the circumferential groove located adjacent to the slidable inner-diameter portion.

13. A master cylinder according to claim 9, wherein the large-diameter bore portion is communicated with the discharge passage.

14. A master cylinder according to claim 1, wherein the communication groove is in an arcuate form and is formed obliquely upward in a radial direction of the slidable inner-diameter portion.

15. A master cylinder according to claim 14, wherein an uppermost point of the communication groove is located on or on an upper side of a tangential line tangent to an uppermost point of the large-diameter bore portion.

16. A master cylinder according to claim 14, wherein the point of maximum depth of the communication groove is located on or on a lower side of a tangential line tangent to an uppermost point of the slidable inner-diameter portion.

17. A master cylinder according to claim 5, wherein an axial dimension of the slidable inner-diameter portion is made smaller than an axial dimension of the circumferential groove located adjacent to the slidable inner-diameter portion.

18. A master cylinder according to claim 14, wherein the large-diameter bore portion is communicated with the discharge passage.

19. A master cylinder according to claim 1, wherein the point of maximum depth of the communication groove is located on or on a lower side of a tangential line tangent to an uppermost point of the slidable inner-diameter portion.

20. A master cylinder according to claim 1, wherein an axial dimension of the slidable inner-diameter portion is made smaller than an axial dimension of the circumferential groove located adjacent to the slidable inner-diameter portion.

* * * * *